(12) United States Patent
Beaston

(10) Patent No.: US 12,266,799 B2
(45) Date of Patent: Apr. 1, 2025

(54) SYSTEMS FOR MONITORING BATTERY PACKS WITHIN A BATTERY ENERGY STORAGE SYSTEM

(71) Applicant: Powin, LLC, Tualatin, OR (US)

(72) Inventor: Virgil Lee Beaston, Lake Oswego, OR (US)

(73) Assignee: Powin, LLC, Tualatin, OR (US)

( * ) Notice: Subject to any disclaimer, the term of this patent is extended or adjusted under 35 U.S.C. 154(b) by 1154 days.

(21) Appl. No.: 16/982,449

(22) PCT Filed: Mar. 19, 2019

(86) PCT No.: PCT/US2019/022992
§ 371 (c)(1),
(2) Date: Sep. 18, 2020

(87) PCT Pub. No.: WO2019/183111
PCT Pub. Date: Sep. 26, 2019

(65) Prior Publication Data
US 2021/0083329 A1  Mar. 18, 2021

Related U.S. Application Data

(60) Provisional application No. 62/645,623, filed on Mar. 20, 2018.

(51) Int. Cl.
*H01M 10/42* (2006.01)
*H01M 4/62* (2006.01)
(Continued)

(52) U.S. Cl.
CPC ........... *H01M 4/62* (2013.01); *H01M 10/425* (2013.01); *H01M 10/482* (2013.01);
(Continued)

(58) Field of Classification Search
CPC ....................................................... H01M 4/62
(Continued)

(56) References Cited

U.S. PATENT DOCUMENTS 6,184,656 B1 * 2/2001 Karunasiri ............... B60L 58/27
342/442
7,619,417 B2 * 11/2009 Klang ................ G01R 31/3647
324/426

(Continued)

OTHER PUBLICATIONS

International Preliminary Report on Patentability dated Sep. 22, 2020, from International Patent Application No. PCT/US2019/022992, 5 pp.

(Continued)

*Primary Examiner* — Yalkew Fantu
(74) *Attorney, Agent, or Firm* — Klarquist Sparkman, LLP

(57) ABSTRACT

In an embodiment, a monitoring system may monitor a selected number of battery packs residing within a battery energy storage system. The monitoring system may include a plurality of battery pack monitoring devices each configured to monitor a battery pack. In an embodiment, the battery pack monitoring device may include a battery pack monitoring controller having a memory and a processor. The battery pack monitoring device may also include a voltage sensor, an ambient temperature sensor, an electric current sensor, a cell voltage sensor, and a cell temperature sensor, each coupled to the processor of the battery pack monitoring controller. The measured voltages, temperatures, and electric current may be stored in the memory of the battery pack monitoring controller.

4 Claims, 21 Drawing Sheets

(51) Int. Cl.
 *H01M 10/48* (2006.01)
 *H02J 7/00* (2006.01)
(52) U.S. Cl.
 CPC ......... *H01M 10/486* (2013.01); *H02J 7/0013* (2013.01); *H02J 7/0047* (2013.01); *H01M 2010/4271* (2013.01); *H01M 2010/4278* (2013.01); *H02J 7/0014* (2013.01); *H02J 7/0048* (2020.01)
(58) Field of Classification Search
 USPC .......................................................... 320/132
 See application file for complete search history.

(56) References Cited

U.S. PATENT DOCUMENTS

| | | | | |
|---|---|---|---|---|
| 8,207,740 | B2 * | 6/2012 | Lin | H01M 10/441 320/119 |
| 10,353,009 | B2 * | 7/2019 | Torai | H01M 10/482 |
| 2004/0263119 | A1 | 12/2004 | Meyer et al. | |
| 2005/0184593 | A1 * | 8/2005 | Gottlieb | H02J 7/0047 307/66 |
| 2007/0229032 | A1 * | 10/2007 | Elder | H01M 10/48 320/132 |
| 2007/0257642 | A1 | 11/2007 | Xiao et al. | |
| 2013/0164567 | A1 | 6/2013 | Olsson et al. | |
| 2014/0266228 | A1 * | 9/2014 | Baruzzi | G01R 31/389 324/430 |
| 2014/0312844 | A1 * | 10/2014 | Mercier | B60L 58/12 320/118 |
| 2016/0091374 | A1 | 3/2016 | Kim et al. | |
| 2017/0113565 | A1 | 4/2017 | Lin et al. | |
| 2018/0010919 | A1 | 1/2018 | Huang et al. | |

OTHER PUBLICATIONS

International Search Report and Written Opinion dated Jun. 5, 2019, from International Patent Application No. PCT/US2019/022992, 7 pp.

* cited by examiner

Battery Pack #11

Vender Supplied Data 1010

| | |
|---|---|
| 3.600 | High Cell Voltage |
| 2.600 | Low Cell Voltage |
| 38.2 | High Cell Temp |
| 9.8 | Low Cell Temp |

Independently Collected Data 1020

| | |
|---|---|
| 3.684 | High Cell Voltage |
| 2.531 | Low Cell Voltage |
| 44.3 | High Cell Temp |
| 3.6 | Low Cell Temp |
| 35.1 | High Amb. Temp |
| 2.5 | Low Amb. Temp |
| 58.9 | High Battery Voltage |
| 40.1 | Low Battery Voltage |
| ... | ... |
| 135 | High Discharge Current |
| 135 | High Charge Current |
| 100 | High % Humidity |
| 46 | Low % Humidity |

FIG. 10

| Battery Pack #10 | Vender Supplied Data | | Independently Collected Data |
|---|---|---|---|
| High Cell Voltage | 3.600 | | Not Monitored |
| Low Cell Voltage | 2.600 | | |
| High Cell Temp | 38.2 | | |
| Low Cell Temp | 9.8 | | |

| Battery Pack #11 | Vender Supplied Data | | Independently Collected Data |
|---|---|---|---|
| High Cell Voltage | 3.600 | | 3.684 |
| Low Cell Voltage | 2.600 | | 2.531 |
| High Cell Temp | 38.2 | | 44.3 |
| Low Cell Temp | 9.8 | | 3.6 |

| Battery Pack #35 | Vender Supplied Data | | Independently Collected Data |
|---|---|---|---|
| High Cell Voltage | 3.600 | | Not Monitored |
| Low Cell Voltage | 2.600 | | |
| High Cell Temp | 38.2 | | |
| Low Cell Temp | 9.8 | | |

FIG. 11

SYSTEMS FOR MONITORING BATTERY PACKS WITHIN A BATTERY ENERGY STORAGE SYSTEM

BACKGROUND

Field

The present disclosure generally relates to electrical energy storage. More particularly, it relates to monitoring battery packs residing within a battery energy storage system.

BRIEF SUMMARY

In an embodiment, a monitoring system may monitor a selected number of battery packs residing within a battery energy storage system. The monitoring system may include a plurality of battery pack monitoring devices each configured to monitor a battery pack. In an embodiment, the battery pack monitoring device may include a battery pack monitoring controller having a memory and a processor. The battery pack monitoring device may also include a voltage sensor configured to measure a voltage of a battery pack residing within the battery energy storage system, an ambient temperature sensor configured to measure an ambient temperature of the battery pack, an electric current sensor configured to measure an electric current of the battery pack, a cell voltage sensor configured to measure a voltage of a battery cell of the battery pack, and a cell temperature sensor configured to measure a temperature of a battery cell of the battery pack. Each sensor may be coupled to the processor of the battery pack monitoring controller. The measured voltages, temperatures, and electric current may be stored in the memory of the battery pack monitoring controller.

Further embodiments, features, and advantages, as well as the structure and operation of various embodiments of the disclosure, are described in detail below with reference to the accompanying drawings.

BRIEF DESCRIPTION OF THE DRAWINGS/FIGURES

The accompanying drawings/figures, which are incorporated herein and form a part of the specification, illustrate the present disclosure and, together with the description, further serve to explain the principles of the embodiments disclosed herein and to enable a person skilled in the pertinent art to make and use the embodiments disclosed herein.

FIG. 10 is a diagram that illustrates example battery usage data collected by both a vendor supplied monitoring system and an independent monitoring system, according to an embodiment.

FIG. 11 is a diagram that illustrates example battery usage data collected by both a vendor supplied monitoring system and an independent monitoring system, according to an embodiment.

Embodiments are described with reference to the accompanying drawings/figures. The drawing in which an element first appears is typically indicated by the leftmost digit or digits in the corresponding reference number.

DETAILED DESCRIPTION

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Figure 1:
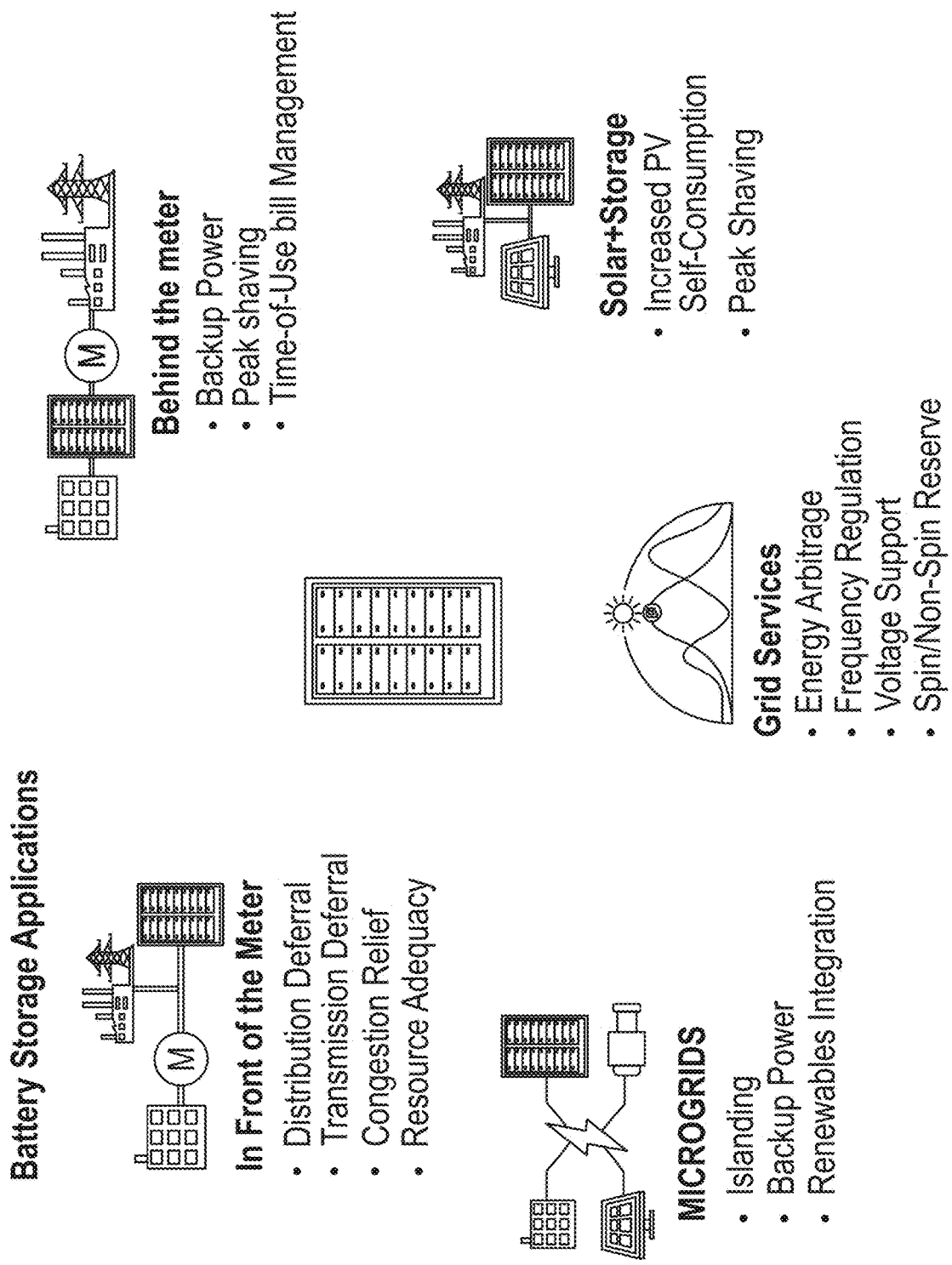
FIG. 1 is a diagram that illustrates various existing battery storage applications.

FIG. 1 is a diagram that illustrates various battery storage applications. The use of batteries to complement conventional and renewable power generation is increasing greatly whether apparent or not to the end consumer. For example, battery storage may be used for: (a) in front of the meter applications, such as distribution deferral, transmission deferral, congestion relief, and resource adequacy; (b) behind the meter applications, such as backup power, peak shaving, and time-of-use bill management; (c) microgrid applications, such as islanding, backup power, and renewables integration; (d) grid services, such as energy arbitrage, frequency regulation, voltage support, and spin/non-spin reserve; and (e) solar or other renewable every storage, such as PV self-consumption and peak shaving.

With increasing applications of large-scale battery storage, operators must monitor battery energy storage systems to ensure optimal performance. If performance is below expectations, operators may seek remedy from warranty and/or insurance providers. However, warranty and insurance providers must also verify whether warranty or insurance conditions have been violated, and typical vendor monitoring systems may not provide the accuracy needed to make that determination. Accordingly, independent monitoring systems, as discussed in detail below, may provide accurate data to verify whether a battery energy storage system is operating at a level covered by warranty and/or insurance.

Figure 2:
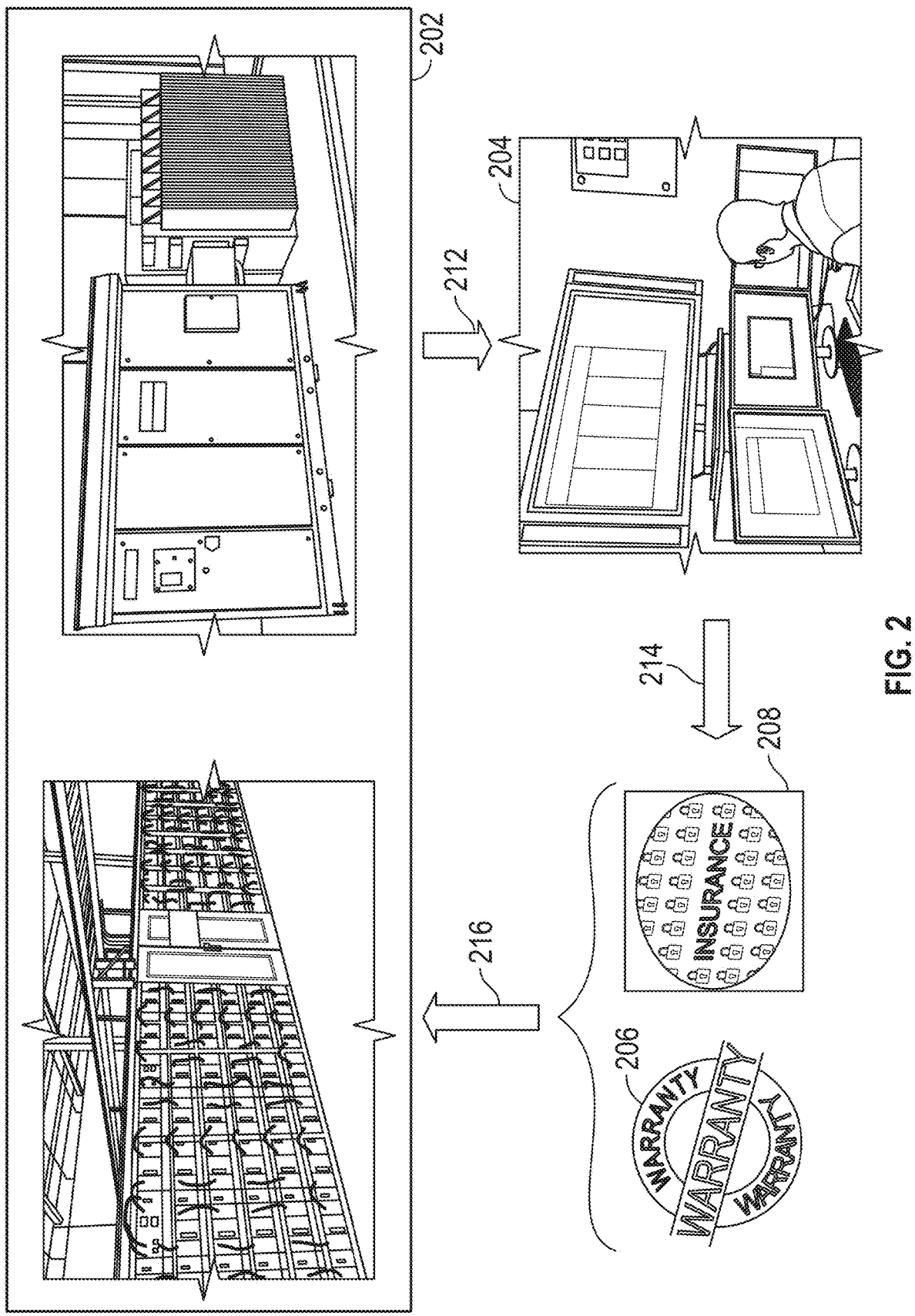
FIG. 2 is a diagram that illustrates monitoring of a battery energy storage system (BESS), according to an embodiment.

FIG. 2 is a diagram that illustrates monitoring of a battery energy storage system (BESS), according to an embodiment. BESS 202 may include a plurality of battery packs, each battery pack including a plurality of battery cells. In some embodiments, each battery pack may include a battery pack controller that monitors the cells of the battery pack, a battery pack cell balancer that adjusts the amount of energy stored in the cells, and a battery pack charger. The battery pack controller may operate the battery pack cell balancer and the battery pack charger to control the voltage (and state-of-charge) of the cells. Additionally or alternatively, a string controller may control the battery pack cell balancers and the battery pack chargers of a group of battery packs within BESS 202 and/or communicate with each battery pack controller of the group of battery packs. In an embodiment, BESS 202 may include a system controller that communicates with each battery pack, for example via each battery pack controller and/or string controller. BESS 202 may be (but is not necessarily) representative of each BESS discussed throughout the present disclosure.

As indicated by arrow 212, a monitoring system 204 may monitor the battery packs of BESS 202. In an embodiment, monitoring system 204 may receive usage data from BESS 202, including temperature, voltage, and/or electric current measurements for the battery packs of BESS 202. As indicated by arrow 214, this monitoring data may be used to determine whether battery pack warranty 206 has expired or has been voided, and whether insurance conditions 208 have been met, which may depend on various usage factors, as discussed in more detail below.

Figure 3:
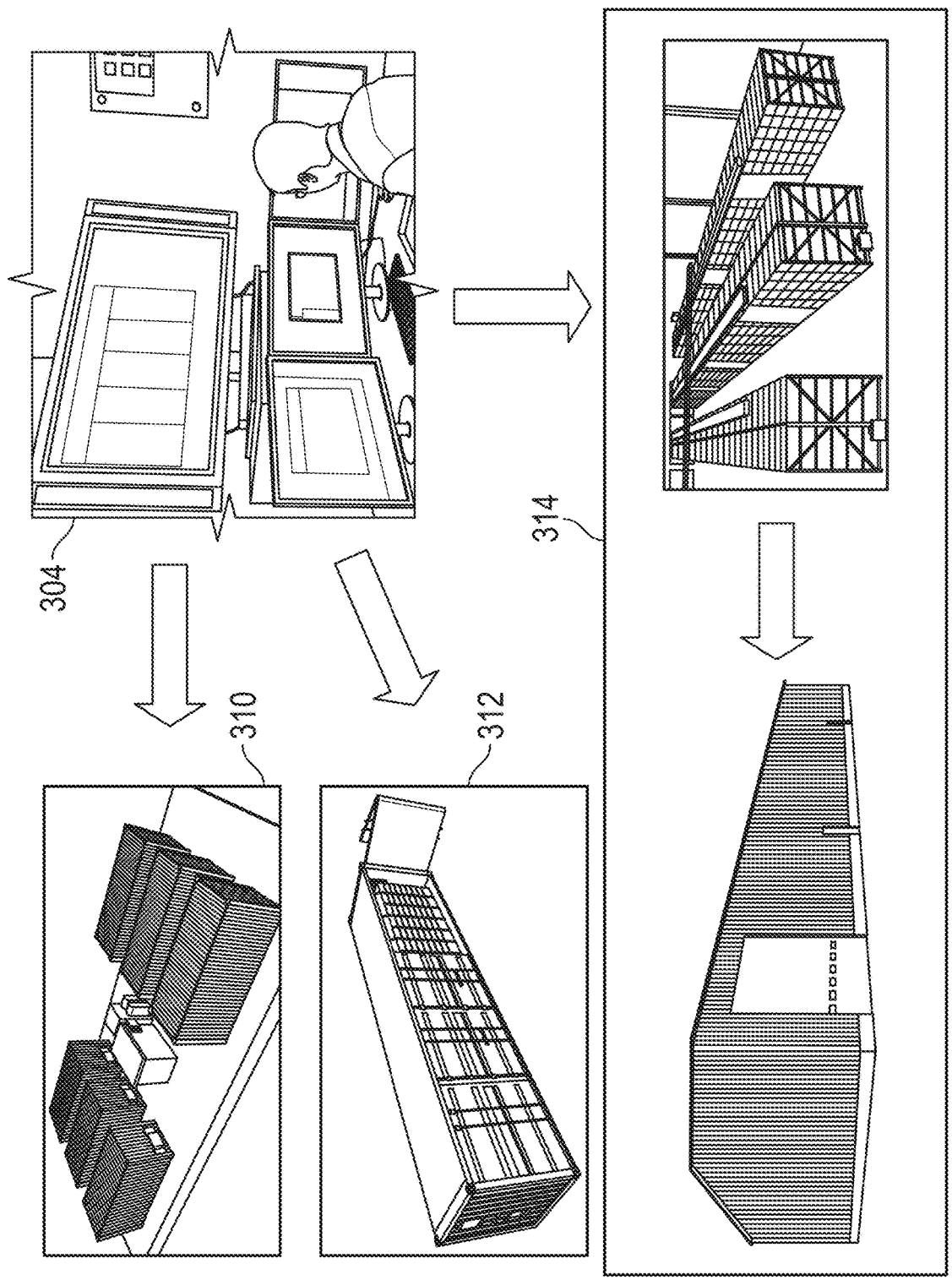
FIG. 3 is a diagram that illustrates monitoring of various battery energy storage systems, according to an embodiment.

FIG. 3 is a diagram that illustrates monitoring of various battery energy storage systems, according to an embodiment. Monitoring system 304 may perform similar functions to those described with respect to monitoring system 204 of FIG. 2. BESS 310 may represent an energy storage system housed in multiple containers. In an embodiment, each container may be similar to a shipping container that can be transported, for example, by truck. BESS 312 may represent an energy storage system housed in a single container. BESS 314 may represent one or more large energy storage systems residing in a building or warehouse. In an embodiment, monitoring system 304 may monitor usage data for the battery packs of BESS 310, 312, and 314.

Figure 4:
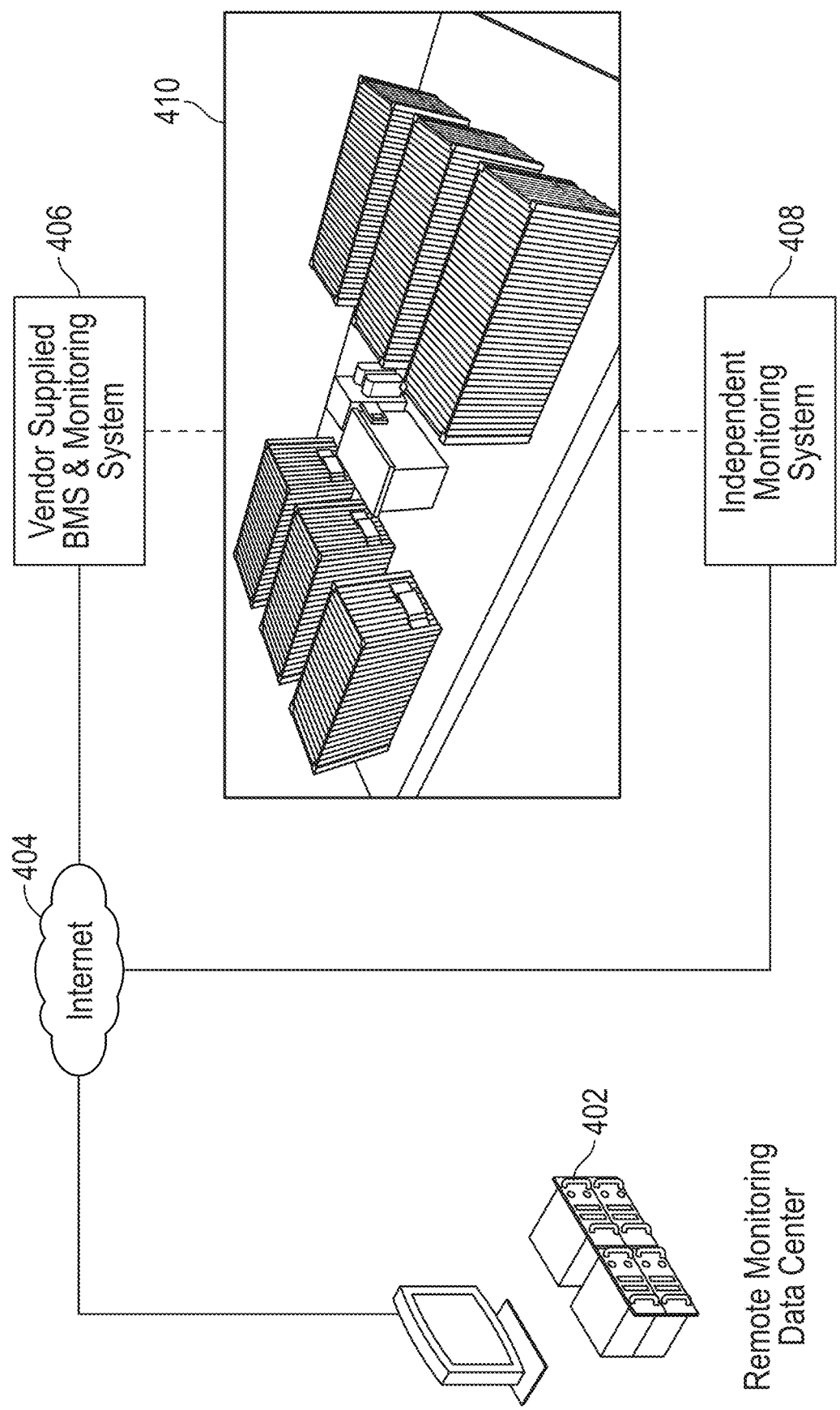
FIG. 4 is a diagram that illustrates monitoring of a battery energy storage system by both vendor supplied and independent monitoring systems, according to an embodiment.

FIG. 4 is a diagram that illustrates monitoring of a battery energy storage system by both vendor supplied and independent monitoring systems, according to an embodiment. BESS 410 may be manufactured and/or installed by a particular vendor. In an embodiment, the vendor may supply a battery management system (BMS) and monitoring system 406 for monitoring each battery of BESS 410. Typically, this may include components capable of recording usage data such as temperature, voltage, and or electric current measurements for each battery pack. In an embodiment, this usage data may be transmitted over a network 404, such as the Internet, to remote monitoring data center 402. Remote monitoring data center 402 may then monitor BESS 410 to ensure proper performance and usage of each battery pack. Remote monitoring data center 402 may be located geographically remote from BESS 410 but need not be. In an embodiment, remote monitoring data center 402 may be located within or at the same location as BESS 410.

However, in large energy storage systems consisting of hundreds or thousands of batteries, accurately monitoring usage of each individual battery pack may require great expense. For this reason, a vendor may use lower-quality components (e.g., temperature sensors, voltage sensors, and processors) to monitor each individual battery in order to reduce costs. As a result, the usage data provided by vendor supplied monitoring system 406 may not be accurate or consistent among various components.

In an embodiment, rather than monitoring each battery pack of BESS 410, independent monitoring system 408 may monitor only selected battery packs to provide sample monitoring data to remote monitoring data center 402 via network 404. For example, if BESS 410 included 100 battery packs, independent monitoring system 408 may only monitor 10 battery packs residing at different locations throughout BESS 410. Because each battery pack is not individually monitored, independent monitoring system 408 may employ high-quality components (e.g., temperature sensors, voltage sensors, and processors) to monitor only the selected battery packs without incurring excessive implementation costs. In an embodiment, the data provided to remote monitoring data center 402 by independent monitoring system 408 may be compared with and used to validate the data provided by vendor supplied monitoring system 406, for example to determine whether a battery pack warranty has expired or has been voided.

Figure 5:
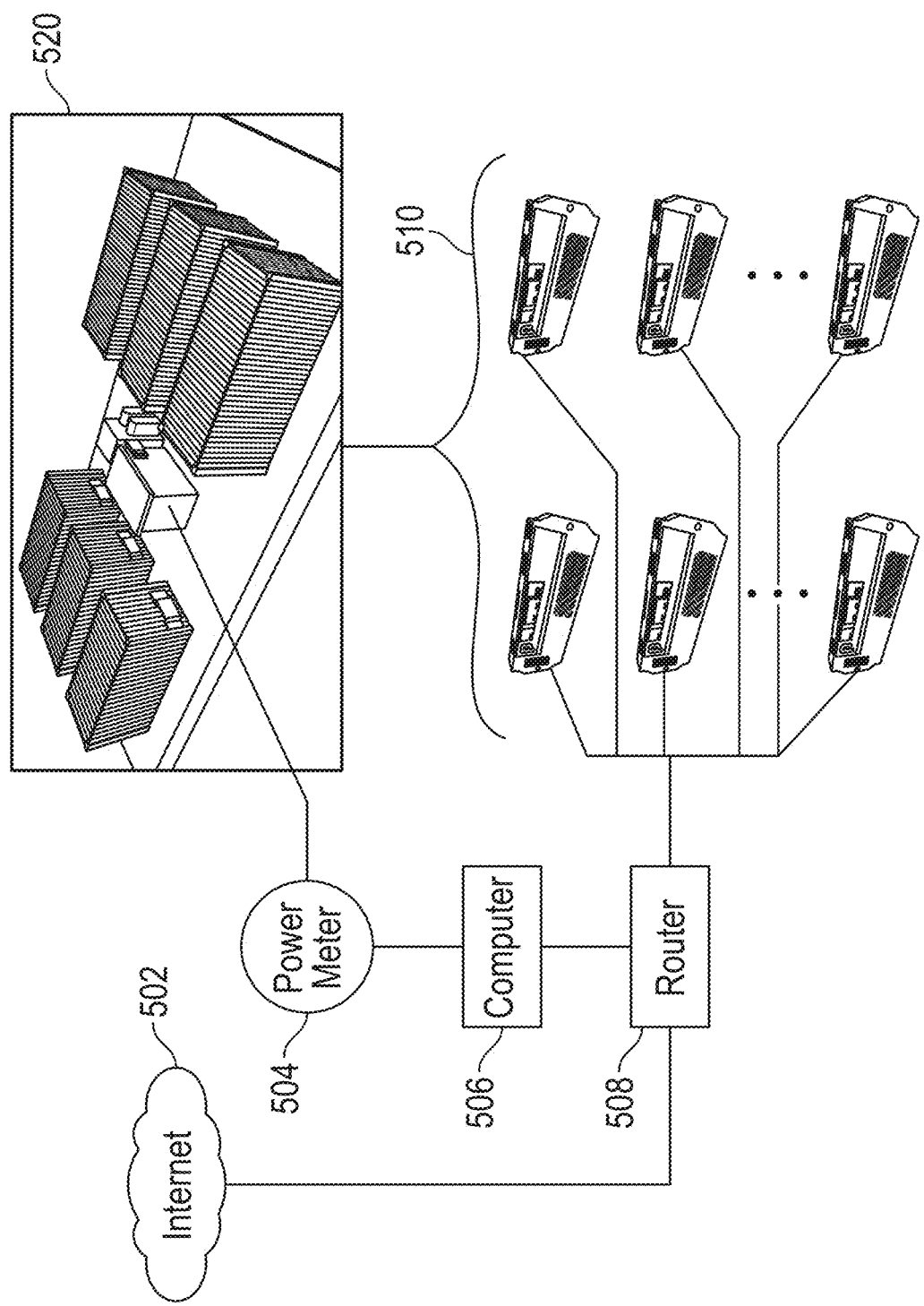
FIG. 5 is a diagram that illustrates an example independent monitoring system, according to an embodiment.

FIG. 5 is a diagram that illustrates an example implementation of an independent monitoring system, according to an embodiment. In an embodiment, an independent monitoring system, such as independent monitoring system 408 of FIG. 4, may employ battery pack monitoring devices 510 connected to selected battery packs of BESS 520. Each of battery pack monitoring devices 510 may be coupled to router 508 and provide battery usage data to a remote monitoring data center, such as remote monitoring data center 402 of FIG. 4, via the Internet 502. In an embodiment, power meter 504 and computer 506 may be coupled to BESS 520 to monitor energy usage of BESS 520. This energy usage may be used to determine accurate billing data, which may be transmitted over the Internet 502 via router 508.

Figure 6:
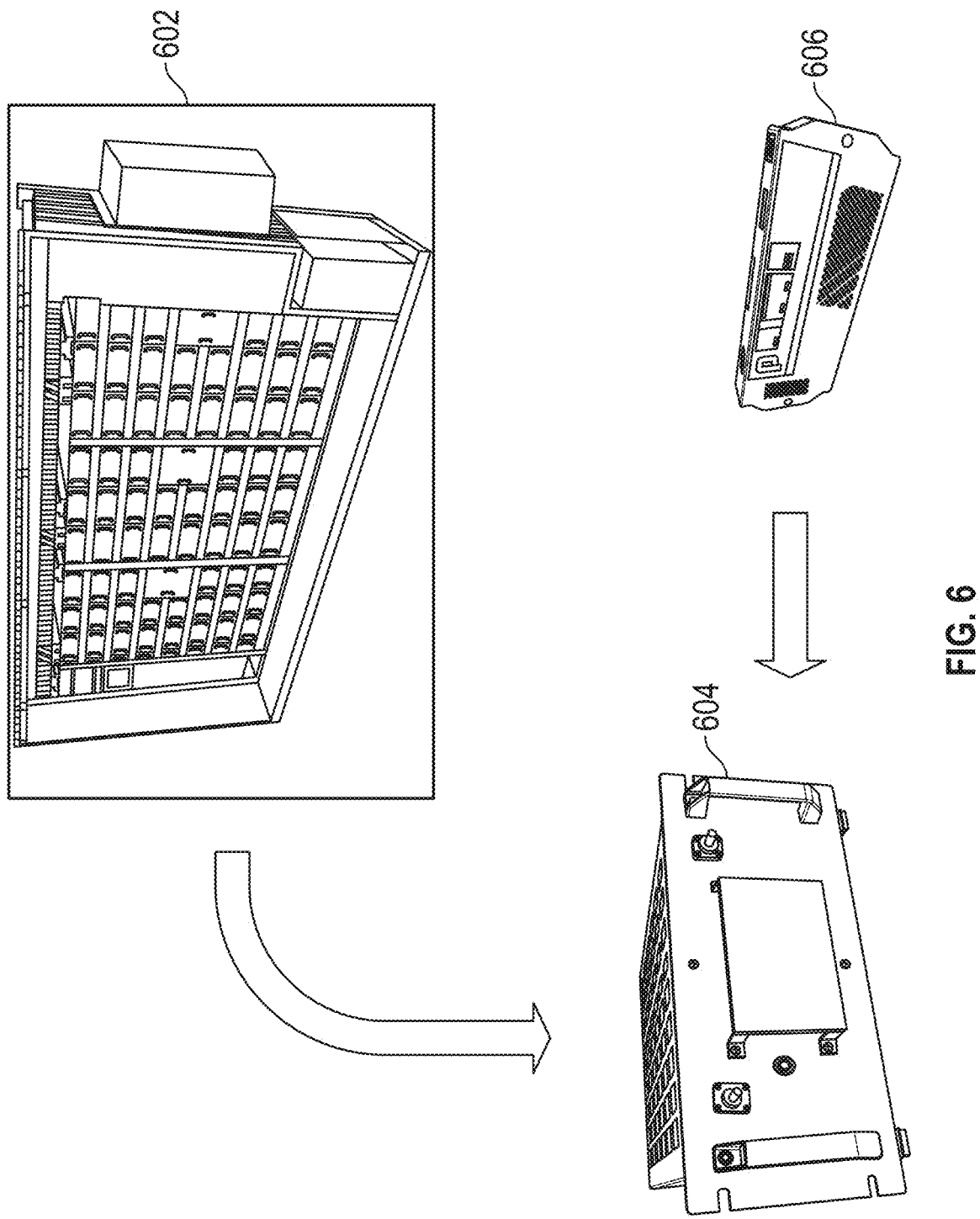
FIG. 6 is a diagram that illustrates another example independent monitoring system, according to an embodiment.

FIG. 6 is another diagram that illustrates an example implementation of an independent monitoring system, according to an embodiment. In an embodiment, BESS 602 may include a plurality of battery packs, such as battery pack 604. A battery pack monitoring device 606, provided by an independent monitoring system, may be connected to battery pack 604 to gather accurate battery usage data, as discussed above.

Figure 7:
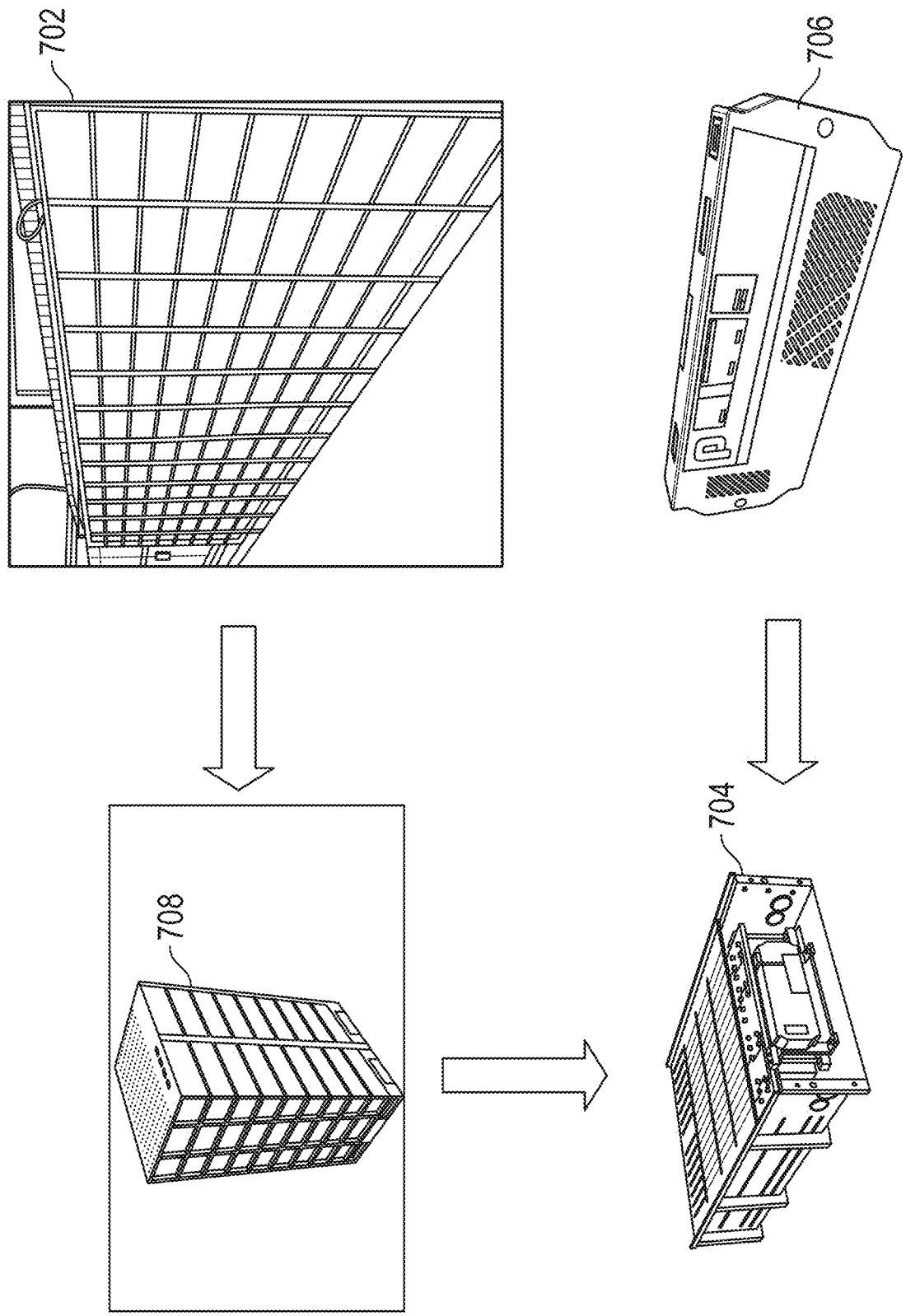
FIG. 7 is a diagram that illustrates another example independent monitoring system, according to an embodiment.

FIG. 7 is another diagram that illustrates an example implementation of an independent monitoring system, according to an embodiment. In an embodiment, BESS 702 may include one or more battery stacks 708. Each battery stack may include a plurality of battery packs, such as battery pack 704. A battery pack monitoring device 706, provided by an independent monitoring system, may be connected to battery pack 704 to gather accurate battery usage data, as discussed above.

Figure 8:
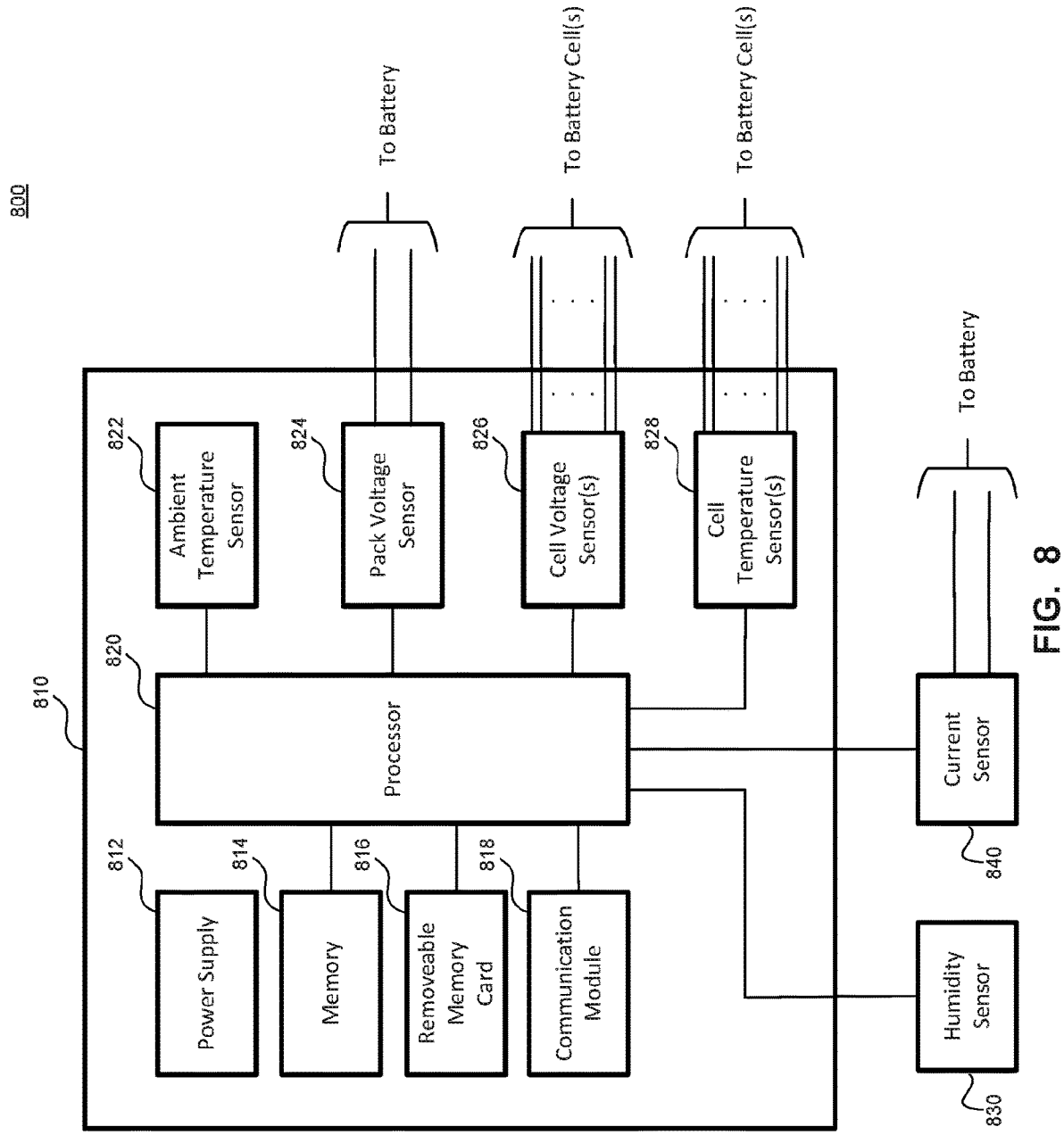
FIG. 8 is a diagram that illustrates an example battery pack monitoring device, according to an embodiment.

FIG. 8 is a diagram that illustrates an example battery pack monitoring device, according to an embodiment. In an embodiment, battery pack monitoring device 800 may include battery pack monitoring controller 810, as well as a separate humidity sensor 830 and electric current sensor 840 connected to battery pack monitoring controller 810. Battery pack monitoring controller 810 may be implemented as one or more circuits or integrated circuits mounted on a printed circuit board.

In an embodiment, battery pack monitoring controller 810 may include a power supply 812, a memory 814, a removable memory card 816, a communication module 818, one or more processors 820, an ambient temperature sensor 822, a battery pack voltage sensor 824, a cell voltage sensor 826, and a cell temperature sensor 828. Communication module 818 may be used to transmit data gathered by battery pack monitoring device 810 to a remote monitoring data center, such as remote monitoring data center 402 of FIG. 4. In some embodiments, pack voltage sensor 824 may record a voltage for the battery, while cell voltage sensor 826 may record voltages of individual or groups of battery cells. Cell temperature sensor 828 may similarly record temperatures of individual or groups of battery cells.

Figure 9:
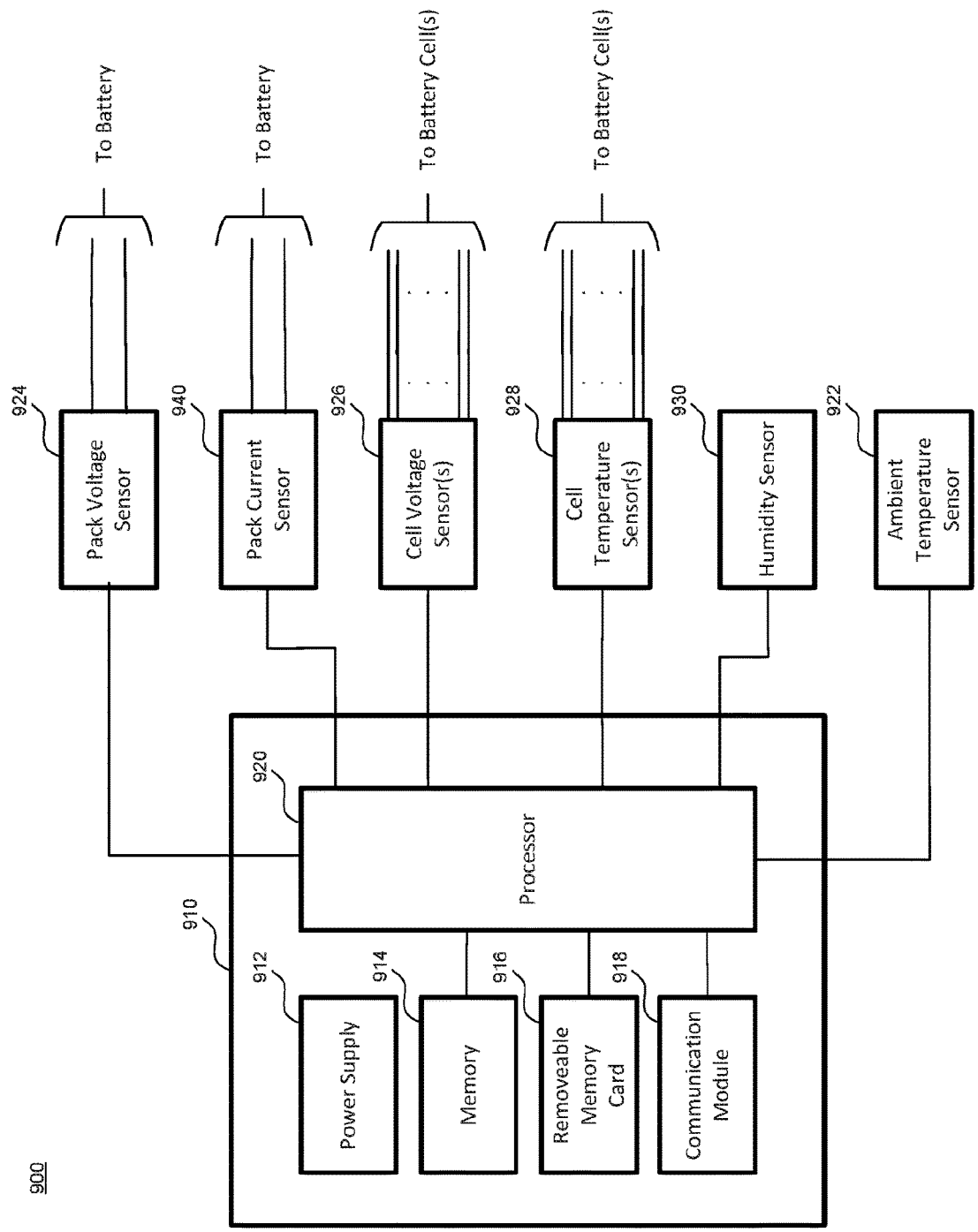
FIG. 9 is a diagram that illustrates another example battery pack monitoring device, according to an embodiment.

FIG. 9 is another diagram that illustrates an example battery pack monitoring device, according to an embodiment. In an embodiment, battery pack monitoring device 900 may include battery pack monitoring controller 910. Battery pack monitoring controller 910 may be implemented as one or more circuits or integrated circuits mounted on a printed circuit board. In an embodiment, battery pack monitoring controller 910 may include a power supply 912, a memory 914, a removable memory card 916, a communication module 918, and one or more processors 920. Communication module 918 may be used to transmit data gathered by battery pack monitoring device 910 to a remote monitoring data center, such as remote monitoring data center 402 of FIG. 4. In an embodiment, humidity sensor 930 and pack electric current sensor 940 may be implemented separate from battery pack monitoring controller 910 and connected to processor 920.

Unlike battery pack monitoring device 800 of FIG. 8, ambient temperature sensor 922, pack voltage sensor 924, cell voltage sensor 926, and cell temperature sensor 928 may also be implemented separate from battery pack monitoring controller 910 and connected to processor 920 of battery pack monitoring controller. Measurements taken by sensors 922, 924, 926, 928, 930, and 940 may be transmitted to processor 920 of battery pack monitoring controller 910, which in turn may be transmitted to a remote monitoring data center. This may enable battery pack monitoring controller 910 to be located separate from the battery pack it is intended to monitor, for example on the top of battery stack 708 of FIG. 7.

FIG. 10 is a diagram that illustrates battery usage data collected by both a vendor supplied monitoring system and an independent monitoring system, according to an embodiment. As discussed above, a vendor supplied monitoring system, such as vendor supplied monitoring system 406 of FIG. 4, typically employs lower-quality components that may gather basic usage data for each battery pack. This usage data for a battery pack (e.g., vendor supplied data 1010) may include, for a particular period of time, a high cell voltage, a low cell voltage, a high cell temperature, and a low cell temperature. In contrast, the independent monitoring system described throughout this disclosure, such as independent monitoring system 408 of FIG. 4, may employ high-quality components to monitor selected battery packs within a battery energy storage system. Using the battery pack monitoring devices described with respect to FIGS. 8 and 9, the monitored usage data (e.g., independently collected data 1020) may include, for a particular period of time, a high and low cell voltage, a high and low cell temperature, a high and low ambient temperature, a high and low battery voltage, a high discharge current, a high charge current, a high and low humidity, and other usage data depending on the particular implementation and configuration of employed sensors.

In addition to providing more data than the typical vendor supplied monitoring system, the data collected by the independent monitoring system may be more accurate due to the quality of components employed. For example, vendor supplied data 1010 shows high and low cell voltages of 3.600 and 2.600, respectively, while independently collected data 1020 shows high and low cell voltages for the same battery of 3.684 and 2.531, respectively. This increased accuracy may be important for determining warranty coverage, for example, as a warranty covering up to 3.6V may be valid under the measurements from the vendor supplied monitoring system, but the independent monitoring system confirms that the warranty should actually be voided.

FIG. 11 is another diagram that illustrates battery usage data collected by both a vendor supplied monitoring system and an independent monitoring system, according to an embodiment. The data shown for battery pack #11 correlates to vendor supplied data 1010 and independently collected data 1020 of FIG. 10. However, while the vendor supplied monitoring system monitors every battery pack, the independent monitoring system monitors only selected battery packs of a battery energy storage system. For example, the independent monitoring system may place a battery pack monitoring device on battery pack #11, but battery packs #10 and #35 are not independently monitored. In an embodiment, to account for these battery packs that are not independently monitored, battery pack monitoring devices of the independent monitoring system may be used to provide estimates for unmonitored battery packs. One of ordinary skill in the art will appreciate that any placement strategy of battery pack monitoring devices may be used to gather a representative sample of battery packs in a battery energy storage system.

Figure 12:
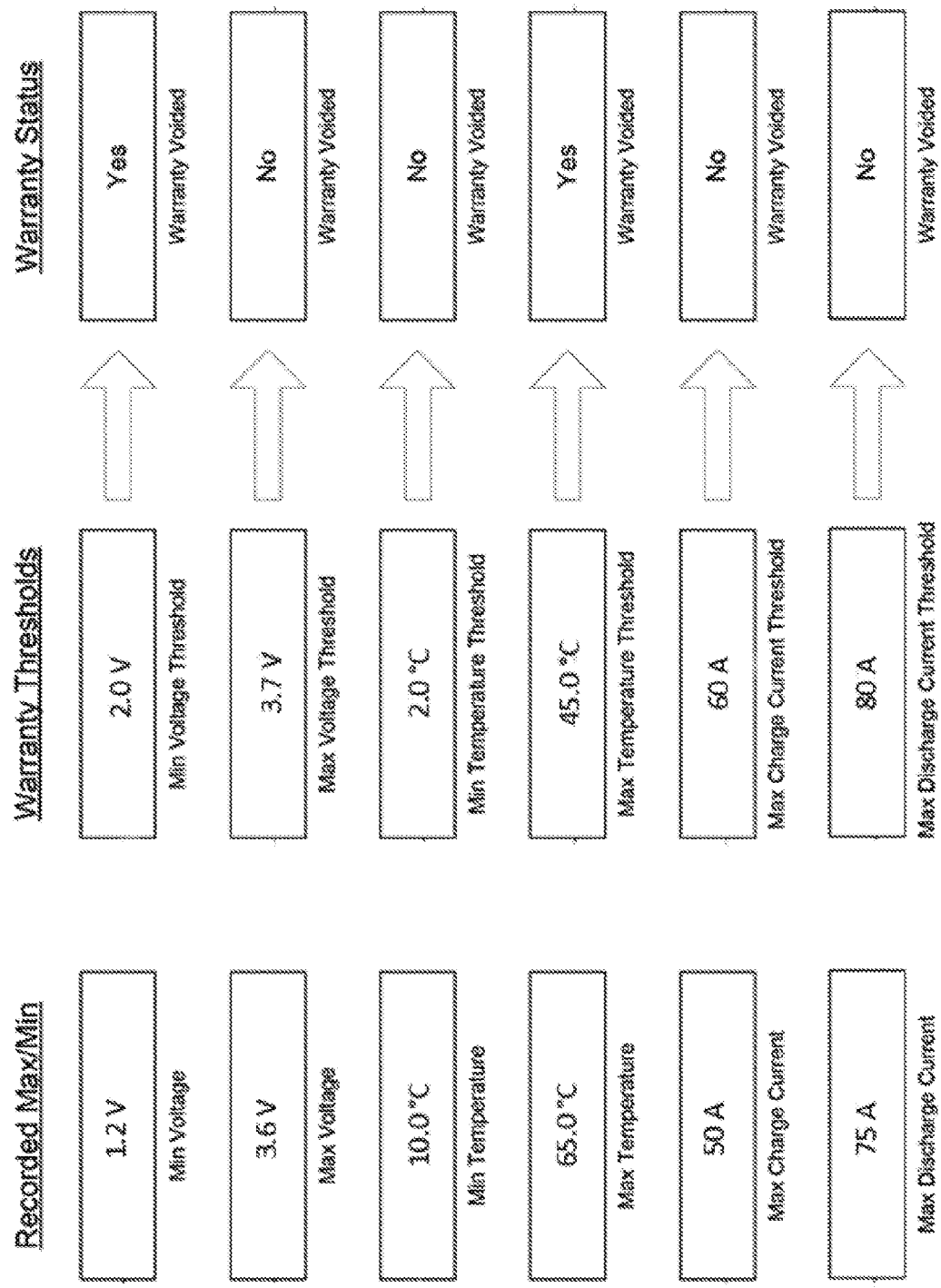
FIG. 12 is a diagram that illustrates example warranty thresholds used for voiding a warranty for a battery pack, according to an embodiment.

FIG. 12 is a diagram that illustrates example warranty thresholds used for voiding a warranty for a battery pack, according to an embodiment. In an embodiment, the Recorded Max/Min values may be gathered by a battery pack monitoring device of an independent monitoring system, such as battery pack monitoring device 800 of FIG. 8 or battery pack monitoring device 900 of FIG. 9. These values may be transmitted to a remote monitoring data center, such as remote monitoring data center 402 of FIG. 4.

In an embodiment, a battery pack warranty, for example battery pack warranty 206 of FIG. 2, may include one or more warranty thresholds used to automatically void a warranty. For example, the battery pack warranty may include a minimum voltage threshold of 2.0V and a maximum voltage threshold of 3.7V during the life of a battery. If either of these thresholds are exceeded by the data collected for the battery pack, the remote monitoring data center or the battery pack monitoring device may determine that the battery pack warranty has been voided. In an embodiment, the warranty thresholds may be stored in a storage device at the remote monitoring data center. Additionally or alternatively, the warranty thresholds may be stored by the battery pack monitoring device, for example in memory 814 or removable memory card 816 of battery pack monitoring device 800.

Figure 13:
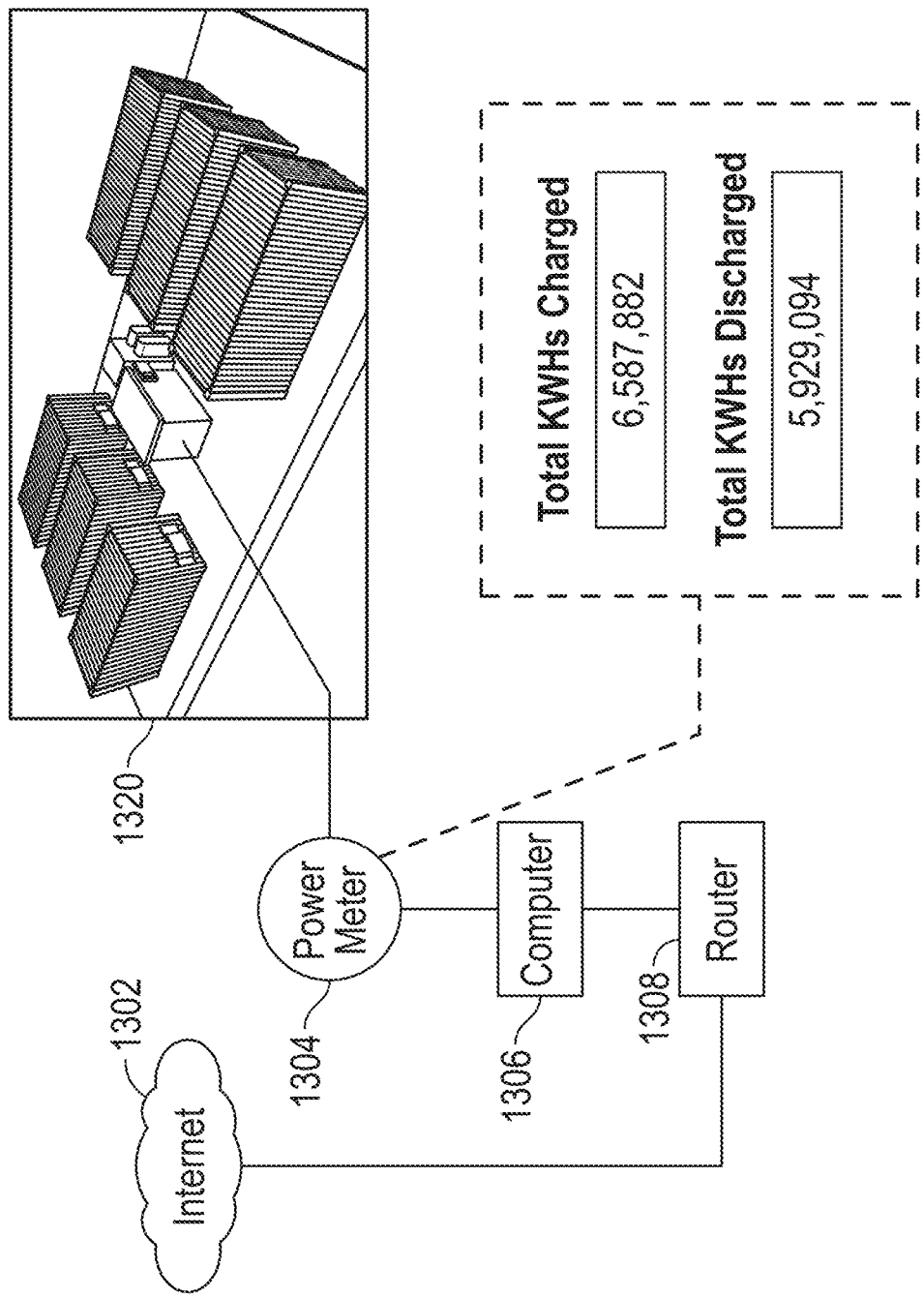
FIG. 13 is a diagram that illustrates example battery usage data gathered by an independent monitoring system, according to an embodiment.

FIG. 13 is a diagram that illustrates example battery usage data gathered by an independent monitoring system, according to an embodiment. In an embodiment, power meter 1304 may be coupled to BESS 1320 to monitor total energy usage of BESS 1320. For example, power meter 1304 may record that the total power usage of BESS 1320 is 6,587,882 KWHs charged and 5,929,094 KWHs discharged. This data may be provided to a remote monitoring data center, such as remote monitoring data center 402 of FIG. 4, via computer 1306, router 1308, and network 1302. In an embodiment, a battery pack warranty may include total charge and discharge usage thresholds, or a combination of the two, for BESS 1320, and the data provided by power meter 1304 may be used to determine whether the warranty has expired or has been voided.

Figure 14:
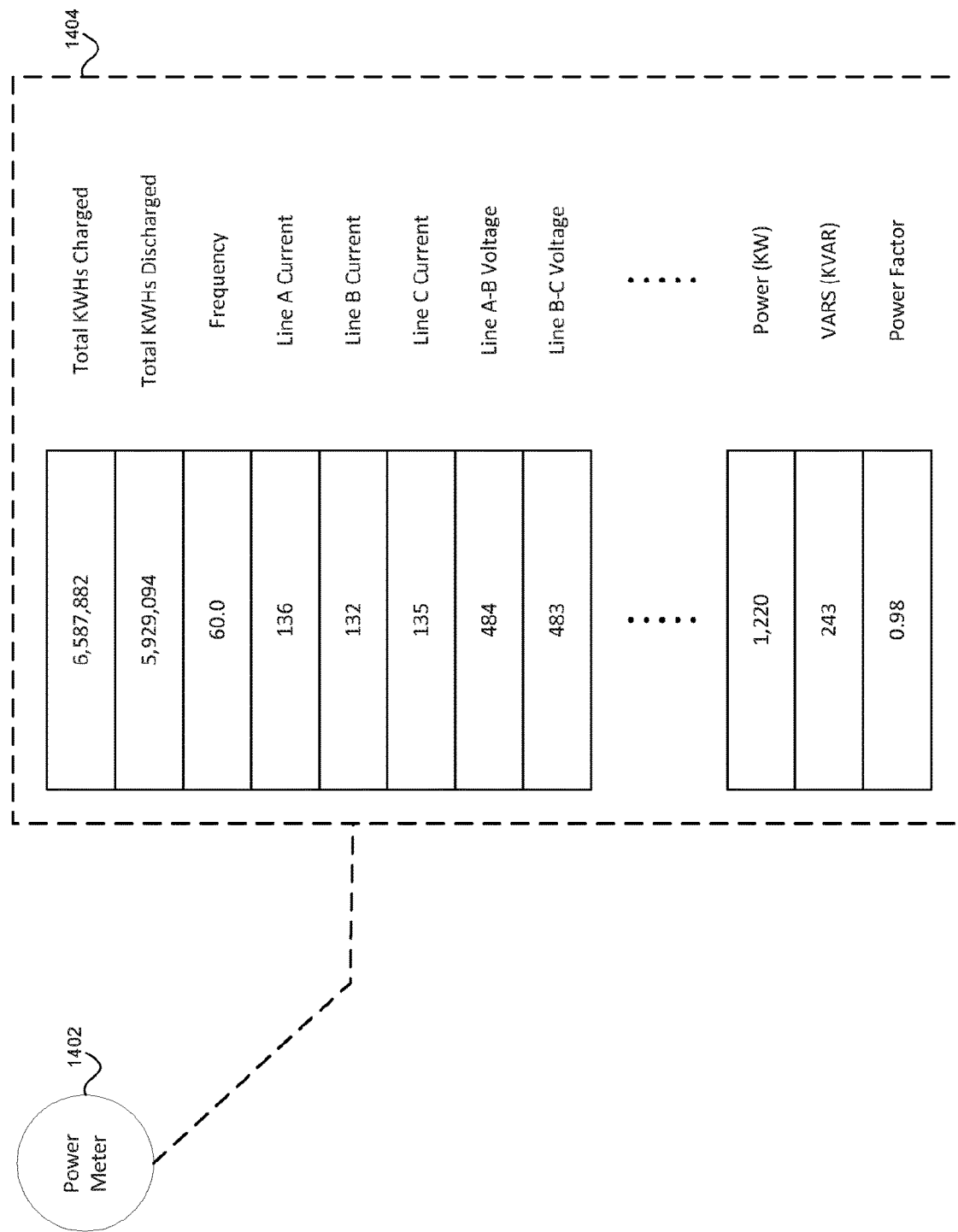
FIG. 14 is a diagram that illustrates example usage data gathered by a power meter, according to an embodiment.

FIG. 14 is a diagram that illustrates example usage data gathered by a power meter, according to an embodiment. In addition to the total KWHs charged and discharged for a battery energy storage system, as discussed with respect to FIG. 13, power meter 1402 may gather additional data that may be provided to a remote monitoring data center, such as remote monitoring data center 402 of FIG. 4. This additional data may include, for example, the information illustrated within data 1404.

Figure 15:
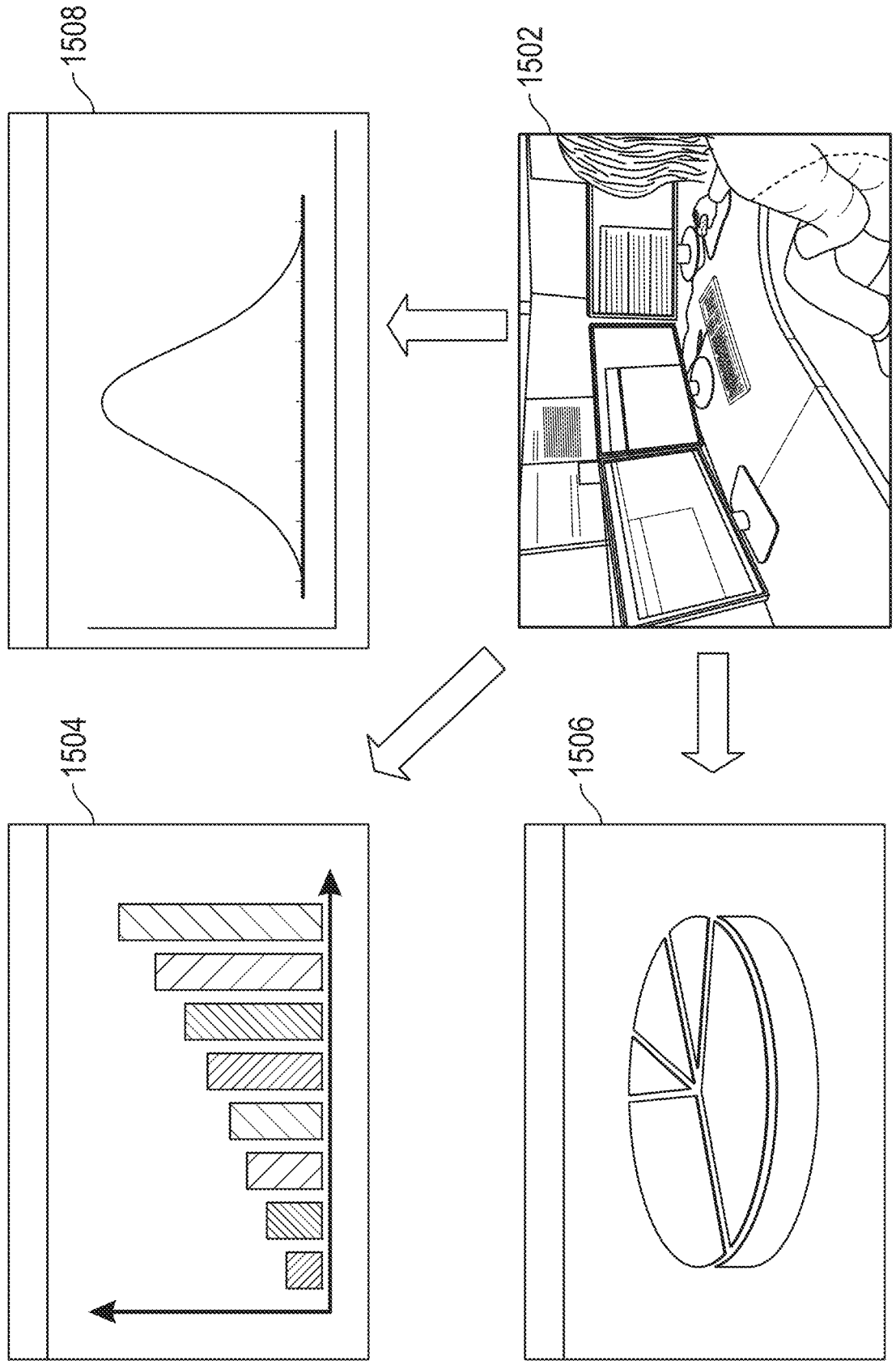
FIG. 15 is a diagram that illustrates monitoring of a battery energy storage system at a remote monitoring data center, according to an embodiment.

FIG. 15 is a diagram that illustrates monitoring of a battery energy storage system at a remote monitoring data center, according to an embodiment. In an embodiment, data received from both a vendor supplied monitoring system and an independent monitoring system may be processed and analyzed by remote monitoring data center 1502. The data may then be displayed in a graphical user interface in various forms to an operator, for example as shown in representations 1504, 1506, and 1508. This display may be used by an operator to detect issues or faults of monitored battery packs, or to compare data in relation to a battery pack warranty or insurance conditions.

Figure 16:
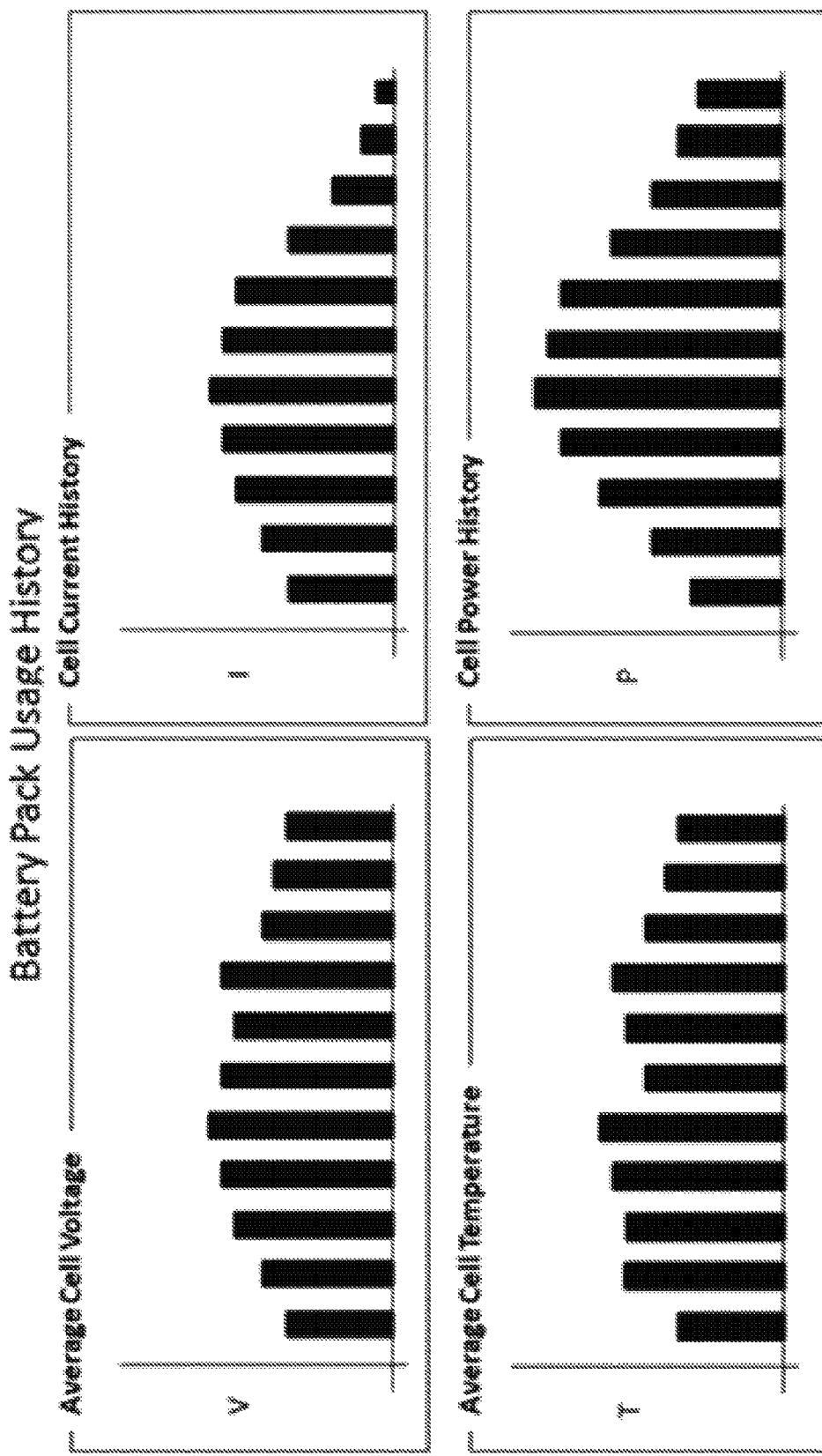
FIG. 16 is a diagram that illustrates example battery usage data for battery packs of a battery energy storage system, according to an embodiment.

FIG. 16 is a diagram that illustrates example battery usage data for battery packs of a battery energy storage system, according to an embodiment. In an embodiment, data provided by either a vendor supplied monitoring system, such as vendor supplied monitoring system 406 of FIG. 4, or an independent monitoring system, such as independent monitoring system 408 of FIG. 4, or a combination thereof, may be plotted to show battery pack usage history for battery packs of a battery energy storage system. For example, the independent monitoring system may provide voltage, electric current, and temperature measurements for selected battery packs of the battery energy storage system. This data may be used to plot battery usage history across the selected battery packs, for example average cell voltage, average cell temperature, cell current, and cell power. This data may then be used to determine whether each battery is being used properly or in accordance with a battery pack warranty. In an embodiment, the battery pack usage history may be generated by a remote monitoring data center, such as remote monitoring data center 402 of FIG. 4.

Figure 17:
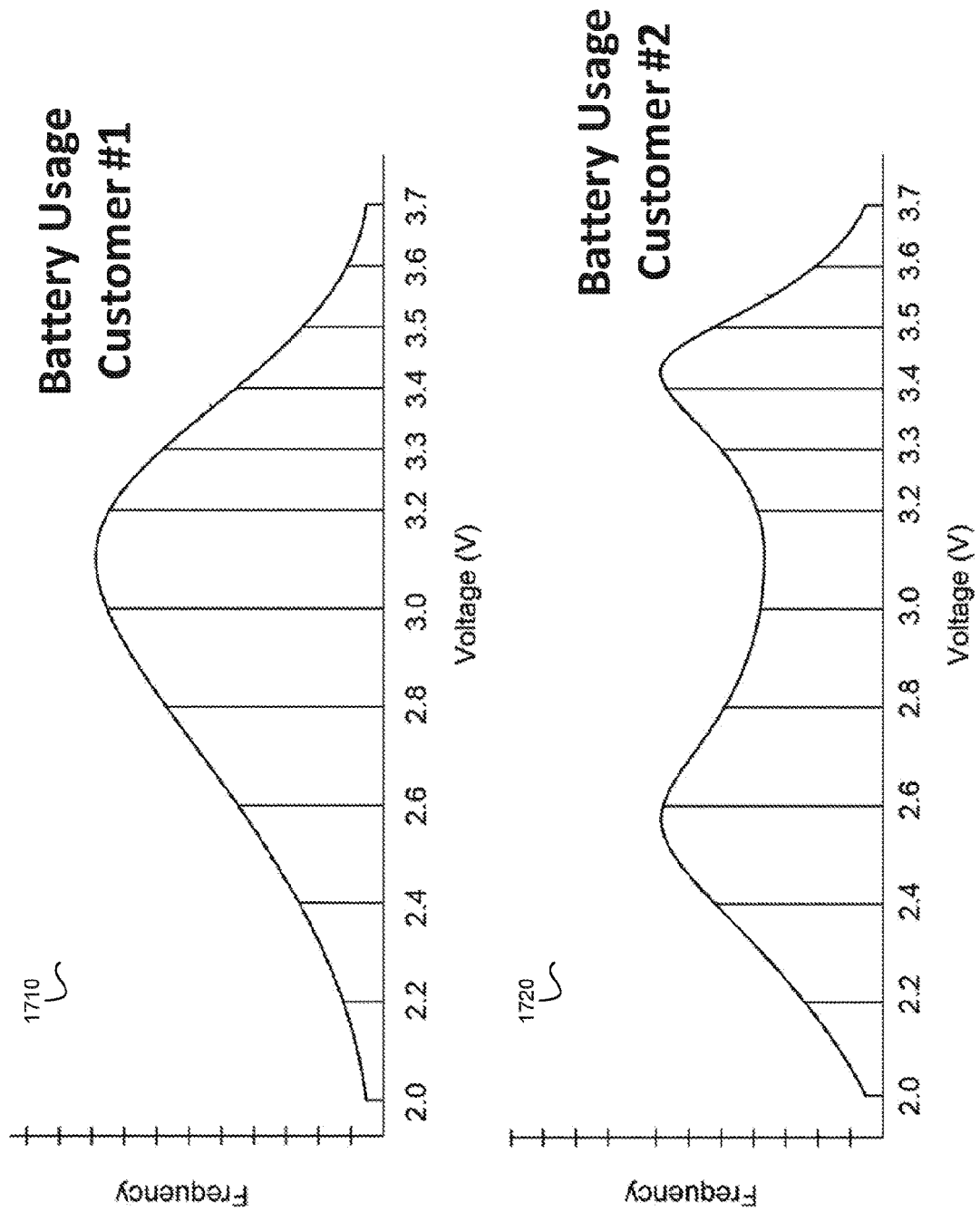
FIG. 17 is a diagram that illustrates example battery usage, according to an embodiment.

FIG. 17 is a diagram that illustrates example battery usage, according to an embodiment. In an embodiment, graphs 1710 and 1720 show battery usage over the life of a particular battery. The x-axis of each graph indicates the voltage of the battery at a particular period in time, and the y-axis indicates the frequency of a particular voltage measurement. In an embodiment, the voltage data may be provided by either a vendor supplied monitoring system or an independent monitoring system, as discussed previously.

Example graph 1710 shows relatively normal use of a battery by Customer #1. In this example, the battery most often operated in the range of 3.0-3.2V. Example graph 1720 shows more extreme use of a battery by Customer #2. In this example, the battery most often operated around 2.6V and 3.4V. This data may be compared to thresholds of a battery pack warranty, such as warranty 206 of FIG. 2, or insurance conditions, such as insurance conditions 208 of FIG. 2, to determine whether the battery usage has violated the warranty or insurance conditions. In an embodiment, graphs 1710 and 1720 may be generated by a remote monitoring data center, such as remote monitoring data center 402 of FIG. 4.

Figure 18:
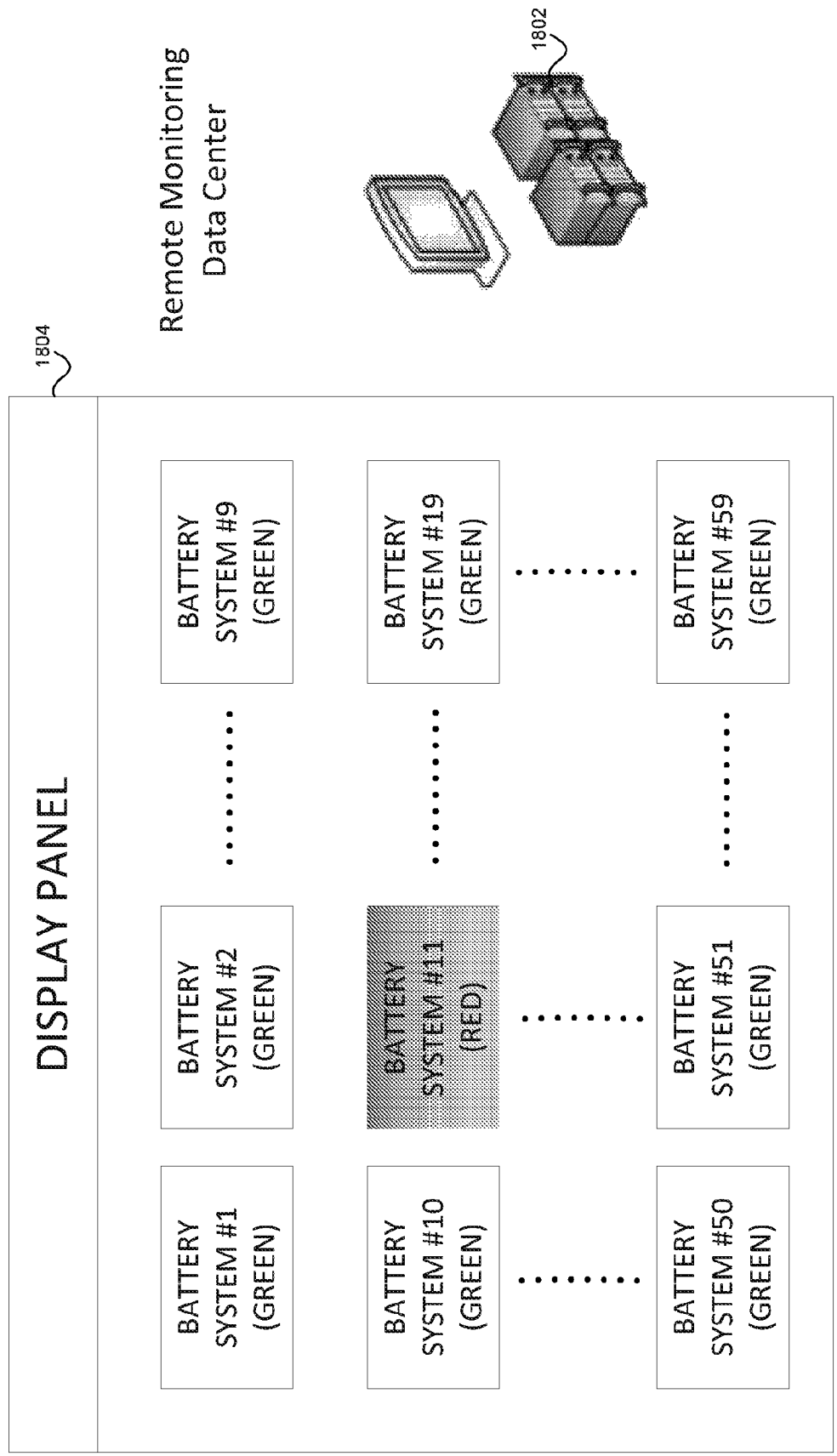
FIG. 18 is a diagram that illustrates monitoring of a battery energy storage system by an independent monitoring system, according to an embodiment.

FIG. 18 is a diagram that illustrates monitoring of a battery energy storage system by an independent monitoring system, according to an embodiment. As discussed with respect to FIG. 5, an independent monitoring system, such as independent monitoring system 408 of FIG. 4, may provide battery usage data for monitored battery packs to remote monitoring data center 1802 (similar to monitoring data center 402 of FIG. 4). In an embodiment, the remote monitoring data center may analyze the data to determine whether each battery pack is being operated within proper limits (e.g., warranty or danger limits). Remote monitoring data center 1802 may then display a status of the monitored battery packs or groups of battery packs in display panel 1804. For example, display panel 1804 shows an issue with battery system #11, which may be based on the received battery usage data from the independent monitoring system. This indication may inform an operator at remote monitoring data center 1802 that an action needs to be taken with respect to battery system #11.

Figure 19:
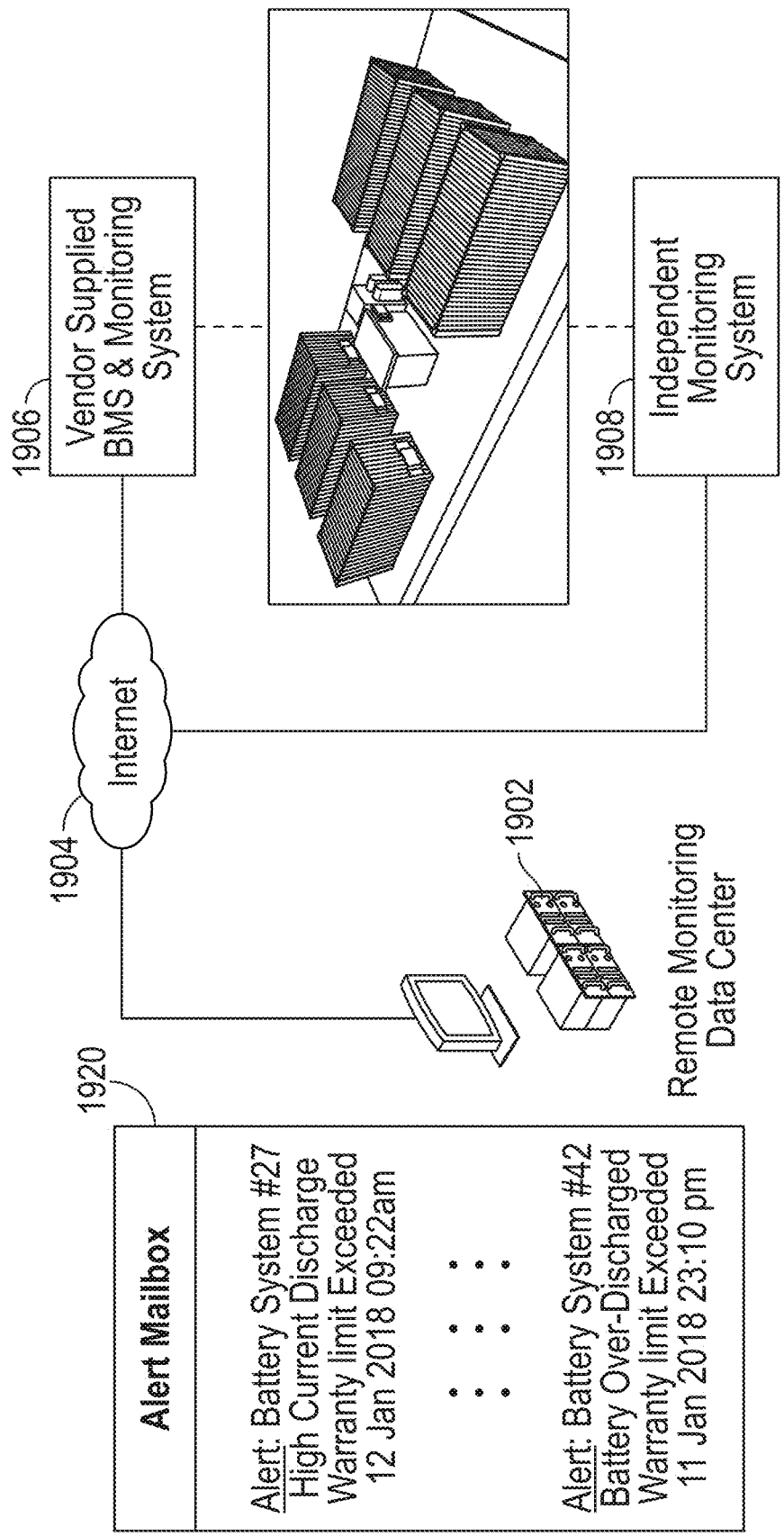
FIG. 19 is another diagram that illustrates monitoring of a battery energy storage system by an independent monitoring system, according to an embodiment.

FIG. 19 is another diagram that illustrates monitoring of a battery energy storage system by an independent monitoring system, according to an embodiment. As discussed with respect to FIG. 5, independent monitoring system 1908 (similar to independent monitoring system 408 of FIG. 4) may provide battery usage data for monitored battery packs of BESS 1910 to remote monitoring data center 1902 (similar to monitoring data center 402 of FIG. 4) via network 1904. In an embodiment, remote monitoring data center 1902 may analyze the data to determine whether each battery pack is being operated within proper limits (e.g., warranty or danger limits). This data may be logged in a database or a file, and alerts may be generated when an issue is detected.

For example, remote monitoring data center 1902 may provide an alert that a high current discharge warranty limit has been exceed, or that an over-discharged warranty limit has been exceeded, as shown in alert mailbox 1920. These alerts may be displayed to an operator at remote monitoring data center 1902 via a graphical user interface, sent to appropriate parties via email or SMS message, or otherwise made accessible to appropriate parties. In an embodiment, the alerts may be accessible via an application programming interface (API) for integration into vendor or third-party applications.

Figure 20:
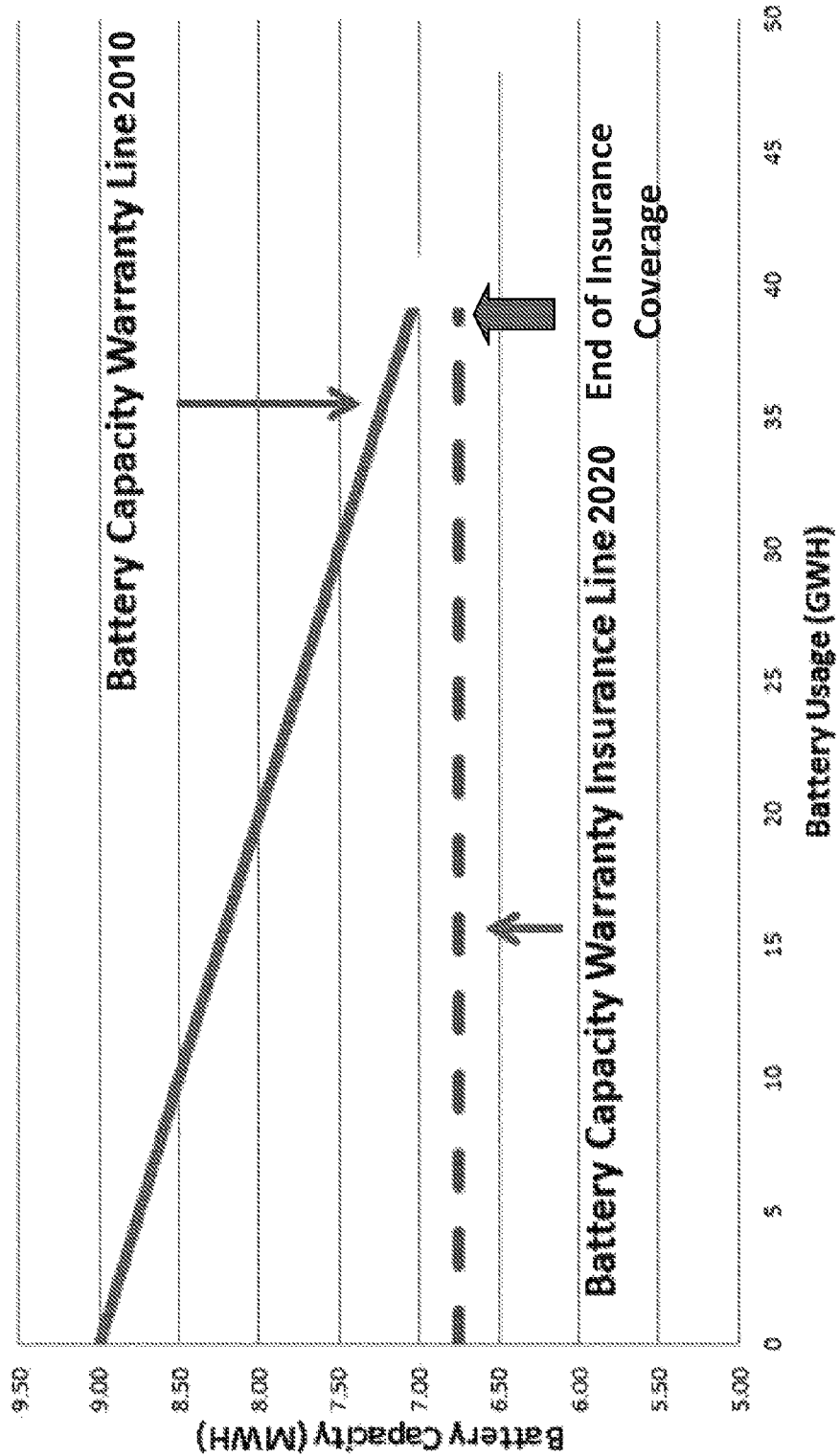
FIG. 20 is a diagram that illustrates example insurance coverage for a battery energy storage system, according to an embodiment.

FIG. 20 is a diagram that illustrates insurance coverage for a battery energy storage system, according to an embodiment. Over time as battery usage increases, battery packs within a battery energy storage system may lose capacity. In an embodiment, battery capacity warranty line 2010 may provide a minimum capacity at a particular battery usage level that is covered by a battery pack warranty. For example, if battery capacity falls below battery capacity warranty line 2010, the battery manufacturer responsible for the warranty may replace or supplement the battery to ensure capacity at battery capacity warranty line 2010. In an embodiment, battery usage may be monitored by a power meter, such as power meter 504 of FIG. 5, and provided to a remote monitoring data center, such as remote monitoring data center 402 of FIG. 4.

Similarly, battery capacity warranty insurance line 2020 may insure a minimum battery capacity based on a particular battery usage level. In this example, battery capacity warranty insurance line 2020 is constant at 6.75 MWH. If the battery capacity drops below 6.75 MWH, the insurance provider may replace or supplement batteries (e.g., by adding additional battery packs) to provide the minimum guaranteed battery capacity. In an embodiment, both warranty and insurance coverage may end after a specified total battery usage level is reached. In this example, both warranty and insurance coverage end after approximately 39 GWH have been used. One of ordinary skill in the art will appreciate that warranty and insurance coverage need not end at the same usage level.

Figure 21:
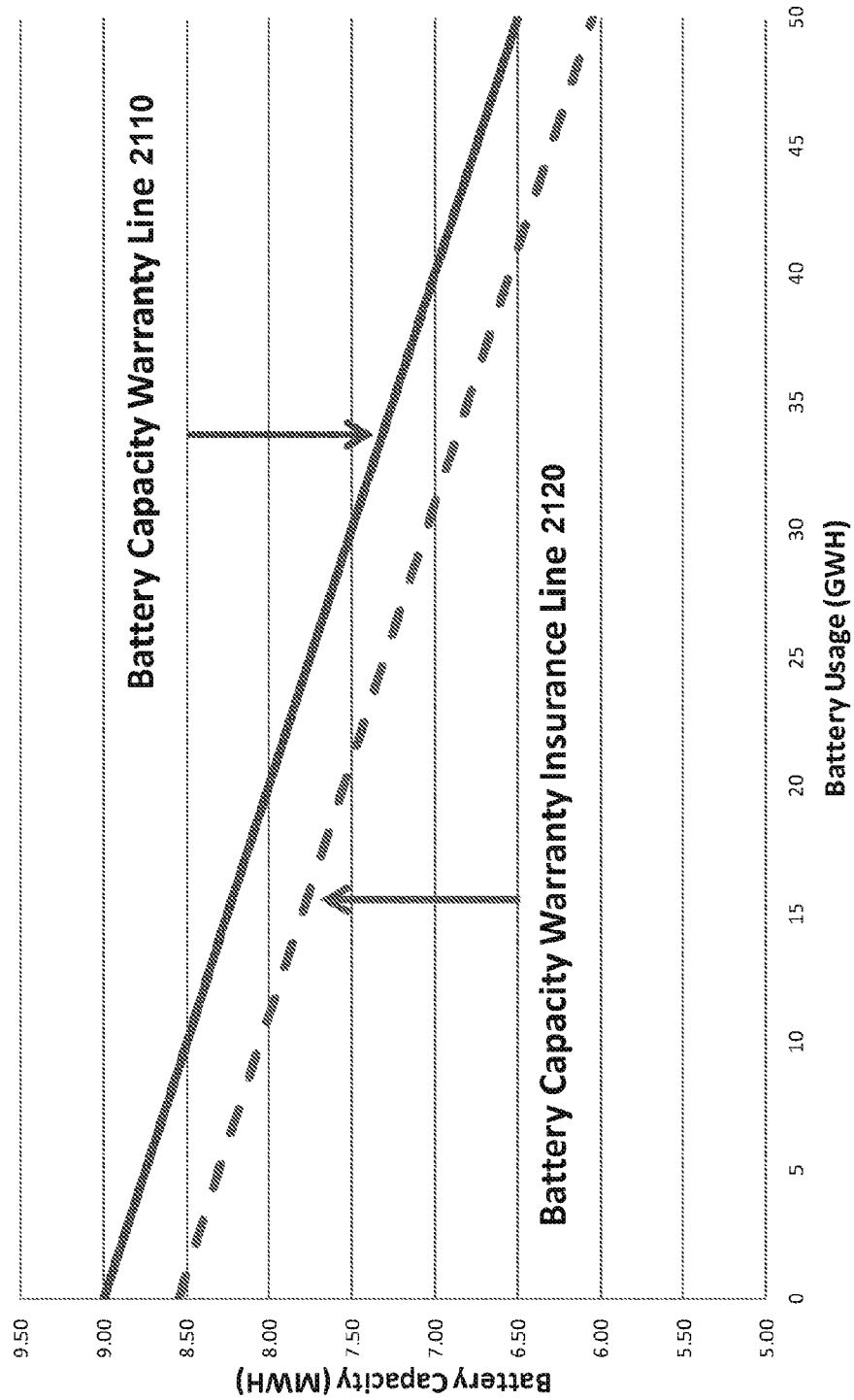
FIG. 21 is a diagram that illustrates example insurance coverage for a battery energy storage system, according to an embodiment.

FIG. 21 is a diagram that illustrates insurance coverage for a battery energy storage system, according to an embodiment. Similar to FIG. 20, battery capacity warranty line 2110 and battery capacity warranty insurance line 2120 provide minimum battery capacities covered by warranty and insurance, respectively. However, in this example, battery capacity warranty insurance line 2120 varies as battery usage increases to provide higher coverage at lower battery usage levels. For example, if battery capacity falls below 8 MWH at a battery usage level of 10 GWH, the insurance provider may replace or supplement batteries (e.g., by adding additional battery packs) to provide the minimum guaranteed battery capacity. The minimum guaranteed battery capacity decreases as the total battery usage increases. One of ordinary skill in the art will appreciate that other warranty and insurance models may be used within the spirit and scope of the present disclosure.

As will be understood by persons skilled in the relevant art(s) given the description herein, various features of the disclosure can be implemented using processing hardware, firmware, software and/or combinations thereof such as, for example, application specific integrated circuits (ASICs). Implementation of these features using hardware, firmware and/or software will be apparent to a person skilled in the relevant art. Furthermore, while various embodiments of the disclosure have been described above, it should be understood that they have been presented by way of example, and not limitation. It will be apparent to persons skilled in the relevant art(s) that various changes can be made therein without departing from the scope of the disclosure.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Also, Identifiers, such as "(a)," "(b)," "(i)," "(ii)," etc., are sometimes used for different elements or steps. These identifiers are used for clarity and do not necessarily designate an order for the elements or steps.

The foregoing description of specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described embodiments, but should be defined only in accordance with the following claims and their equivalents.

What is claimed is:

1. A battery pack monitoring system, comprising:
    a battery pack monitoring controller, comprising:
        a memory; and
        a processor coupled to the memory;
    a voltage sensor coupled to the processor and configured to measure a voltage of a monitored battery pack residing within a battery energy storage system that comprises a plurality of battery packs;
    an ambient temperature sensor coupled to the processor and configured to measure an ambient temperature of the monitored battery pack;
    an electric current sensor coupled to the processor and configured to measure an electric current of the monitored battery pack;
    a cell voltage sensor coupled to the processor and configured to measure a voltage of a battery cell of the monitored battery pack; and
    a cell temperature sensor coupled to the processor and configured to measure a temperature of a battery cell of the monitored battery pack,
    wherein the measured voltages, the measured temperatures, and the measured electric current are stored in the memory of the battery pack monitoring controller, and
    wherein the monitoring system is configured to monitor a subset of the plurality of battery packs of the battery energy storage system that comprises more than one battery pack and fewer than all battery packs of the plurality of battery packs.

2. The battery pack monitoring system of claim 1, wherein the battery pack monitoring controller further includes a communication interface coupled to the processor and configured to communicate the measured voltages, the measured temperatures, and the measured electric current to a remote monitoring data center.

3. The battery pack monitoring system of claim 2, wherein the remote monitoring data center is geographically remote from the battery energy storage system.

4. The battery pack monitoring system of claim 1, wherein one or more of the measured voltages, the measured temperatures, or the measured electric current are used to determine whether a battery pack warranty has expired or been voided.

* * * * *